US007096993B2

(12) United States Patent
Röll

(10) Patent No.: US 7,096,993 B2
(45) Date of Patent: Aug. 29, 2006

(54) STEERING MECHANISM

(75) Inventor: Roland Röll, Filderstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/030,598

(22) Filed: Jan. 6, 2005

(65) Prior Publication Data

US 2005/0155813 A1 Jul. 21, 2005

(30) Foreign Application Priority Data

Jan. 7, 2004 (DE) ...................... 10 2004 001 137

(51) Int. Cl.
*B62D 5/06* (2006.01)

(52) U.S. Cl. ...................... 180/417; 180/414; 180/415; 180/416

(58) Field of Classification Search ................. 180/417
See application file for complete search history.

(56) References Cited

U.S. PATENT DOCUMENTS 3,878,695 A * 4/1975 Pitner .......................... 464/89
3,890,854 A * 6/1975 Pitner .......................... 74/492
4,479,786 A * 10/1984 De Bisschop ................ 464/89
5,531,287 A * 7/1996 Sherman ..................... 180/417
5,659,854 A * 8/1997 Masuda et al. ............. 399/176
5,851,006 A * 12/1998 Spillner et al. ............. 267/273
5,902,186 A * 5/1999 Gaukel ....................... 464/162
5,916,026 A 6/1999 Sadakata
6,283,867 B1 * 9/2001 Aota et al. ..................... 464/74

FOREIGN PATENT DOCUMENTS

| | | |
|---|---|---|
| DE | 35 27 236 | 2/1986 |
| DE | 102 26 949 | 1/2003 |
| EP | 0 392 858 | 10/1990 |
| JP | 09 088 993 | 3/1997 |

* cited by examiner

*Primary Examiner*—Lesley D. Morris
*Assistant Examiner*—Marlon Arce-Diaz
(74) *Attorney, Agent, or Firm*—Klaus J. Bach

(57) ABSTRACT

In a steering mechanism for a motor vehicle having a steering wheel with a steering shaft connected to a steering gear arrangement, the steering shaft comprises a first vibration damping element for accommodating and attenuating vibrations with relatively low amplitudes as they are generated by uneven road surfaces and a second element having lower damping characteristics than the first element for the transmission of steering movements from the steering wheel to the steering gear arrangement.

7 Claims, 2 Drawing Sheets

20
26
27
6 7 8 9 10 7 6
16
24
3
15 15
4
2
14
13
12
1
11

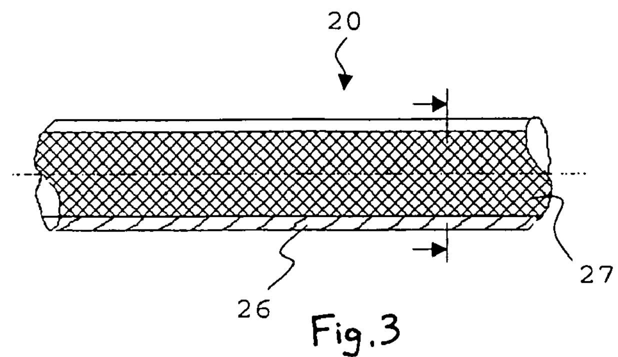
Fig. 3
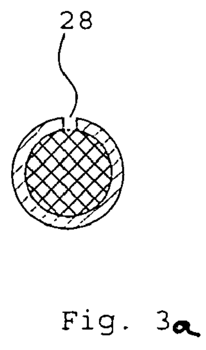
Fig. 3a
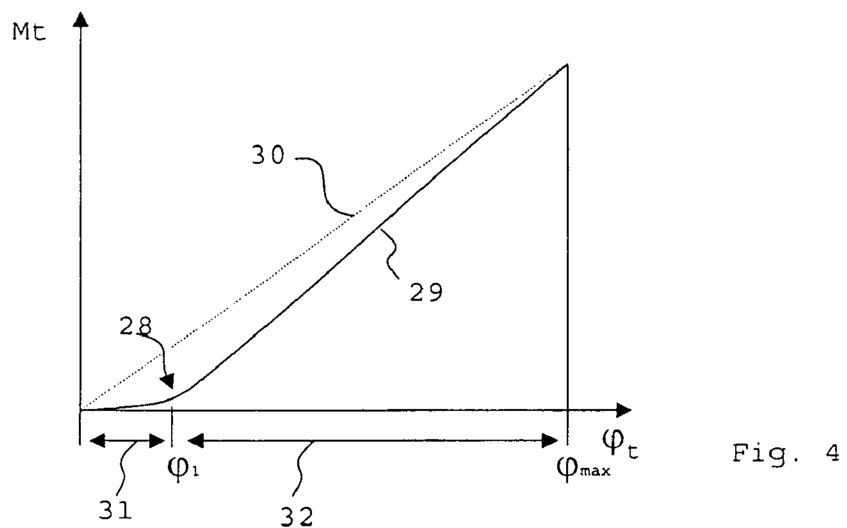
Fig. 4
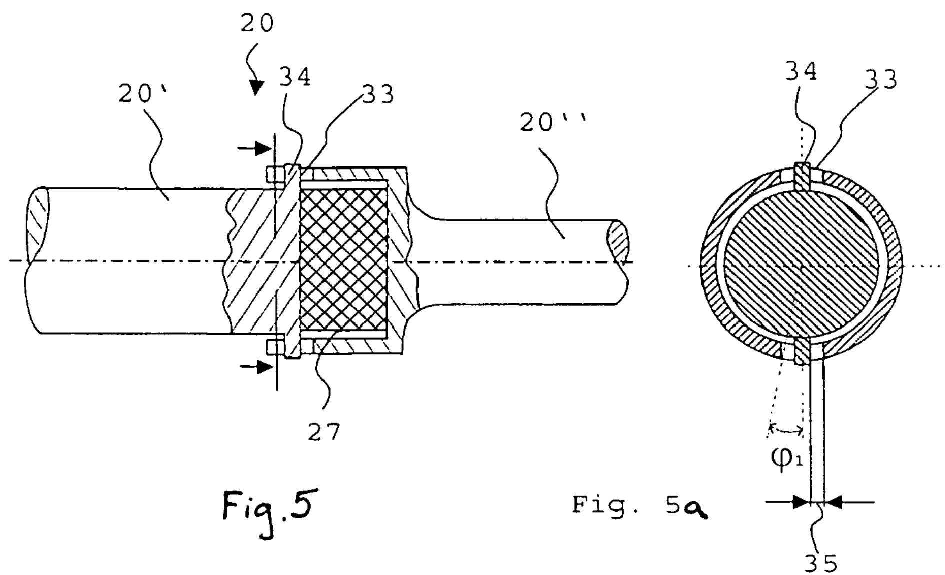
Fig. 5
Fig. 5a

STEERING MECHANISM

BACKGROUND OF THE INVENTION

The invention relates to a steering mechanism for a motor vehicle, including a steering wheel which is connected by way of a shaft to a steering gear.

DE 35 27 236 A1 discloses a steering mechanism which includes a pinion and a steering rack arranged in a steering gear housing. A friction structure is provided for absorbing shocks effective on the steering rack. In this way, rotational steering wheel vibrations caused by wheel flutter are dampened. The friction structure comprises an engagement ring arranged on the steering wheel shaft and a friction disc pressed against the engagement ring. The engagement force is determined by a spring under tension.

It is the object of the present invention to provide an arrangement for damping oscillations in vehicle steering systems which do not need additional friction structures.

SUMMARY OF THE INVENTION

In a steering mechanism for a motor vehicle having a steering wheel with a steering shaft connected to a steering gear arrangement, the steering shaft comprises a first vibration damping element for accommodating and attenuating vibrations with relatively low amplitudes as they are generated by uneven road surfaces and a second element having lower damping characteristics than the first element for the transmission of steering movements from the steering wheel to the steering gear arrangement.

In the steering mechanism according to the invention, the shaft comprises two elements. The first element is provided for generating an uncoupling of the steering wheel from vibrations in the steering gear, which are caused by unevenness of the road surface. The second element has essentially the purpose of transferring steering torques occurring during operation of the motor vehicle. For this reason, a rotationally rigid metallic material is to be used for the second element which has smaller damping characteristics than the first element. Preferably, the shaft according to the invention provides for oscillation damping and a safe torque transmission.

In one embodiment of the invention, the first element is deformed when torsion impulses with small amplitudes occur and dampens oscillations. Torsion impulses with small amplitude are to be understood to be caused by the road surface. These small oscillations or vibrations which do not affect the travel direction of the vehicle result in a deformation of the first element so that the oscillations are damped and are uncoupled from the steering wheel in an advantageous way.

In a particular embodiment, the first element consists of a vibration damping elastomer material. An elastomer material is elastic; at the same time, it has good damping properties by an inner friction in the material.

In a further embodiment of the invention, the second element has no, or only very small, spring rates with impulses of small amplitudes. For properly utilizing the damping properties of the first element, the second element should, with a parallel arrangement of the first and the second element, have only a small spring stiffness in connection with small vibration amplitudes. In this way, it is ensured that the damping properties of the first element dominate the elastic influences of the second element and an effective vibration damping is achieved.

In another embodiment of the invention, the second element has a larger spring rate with large amplitudes or movements as they occur for the transfer of a steering motion as it has with small oscillation.

Such larger amplitudes or motions, that is larger angular displacements of the second element relative to the first element, occur for example with a rotation of the steering wheel for changing the travel direction. In order to be able to safely transfer the steering motion or torque from the steering wheel to a pinion of the steering gear, the second element has to have a sufficient spring stiffness.

In a particular embodiment, the second element is in the form of a slotted tube. The slot closes under a certain torsion force and, with the slot closed, the spring rate increases substantially. With the slotted tube, a two-stage characteristic spring performance line for torsion loads is obtained in a simple manner. As long as the slot is open, the spring stiffness of the tube is small in connection with small torsion loads. As a result, with a parallel arrangement of the first and the second element, in this operating range, the damping properties of the first element prevail. As soon as, with a predetermined torsion moment, the slot of the tube is closed the spring stiffness is suddenly increased. In this operating range, the characteristic spring performance line of the tube determines the spring properties of the shaft.

In a particular embodiment of the invention, the first element is arranged within the tubular second element in a parallel arrangement and is firmly connected to the second element. With the arrangement of the first element within the second element, the parallel arrangement is achieved in a simple manner. The first element is firmly cemented or vulcanized to the inside wall of the tube.

In another embodiment, the first and the second elements are arranged in series. Because of the series arrangement and the larger differences with regard to the rotational rigidity between the first and the second element, it is ensured that at first, the first and the second element and, with increasing torque moments, the second element are deformed. Torsion vibrations, that is, vibrations with small amplitudes therefore result mainly in a deformation of the first element for damping vibrations. In a further embodiment of the invention, the first element is rotatable relative to the second element by a predetermined angle while, with larger angular displacements exclusively the second element is rotated. The torque transmission capability of the first element is limited. The first element cannot transmit the maximum steering torque. Therefore, the first element is subjected to a torque only to a certain angular displacement beyond which torques are transmitted by the second element. In this way, the first element is protected from excessive loads in an advantageous manner.

In a further embodiment of the invention, the shaft is a torsion rod of a power steering arrangement which, dependent on the angular twisting of the torsion rod generates an auxiliary steering force. Torsion rods are provided in power steering systems for sensing steering torques. Depending on the twisting angle of the torsion rod a hydraulic auxiliary force may be provided wherein a steering valve admits a pressurized fluid to a cylinder piston unit depending on the twist angle of the torsion rod. In the same way, a torsion rod may be utilized with an electrical power steering system: An electric sensor measures the twisting of the torsion rod and an electric motor generates a torque supporting the steering movement depending on the twisting angle of the torsion rod.

Other features and feature combinations will become apparent from the following description on the basis of the accompanying drawings. Actual embodiments of the invention are shown in the drawings in a simplified schematic representation.

BRIEF DESCRIPTION OF THE DRAWINGS

FIGS. 3 and 3*a* show in longitudinal and transverse cross-sectional views a section of a torsion rod according to the invention, FIG. 4 shows the characteristic performance lines for a torsion rod according to the invention and a conventional torsion rod, and FIGS. 5 and 5*a* show a particular embodiment of a torsion rod according to the invention in longitudinal and transverse cross-sectional views.

DESCRIPTION OF THE PREFERRED EMBODIMENTS

Figure 1:
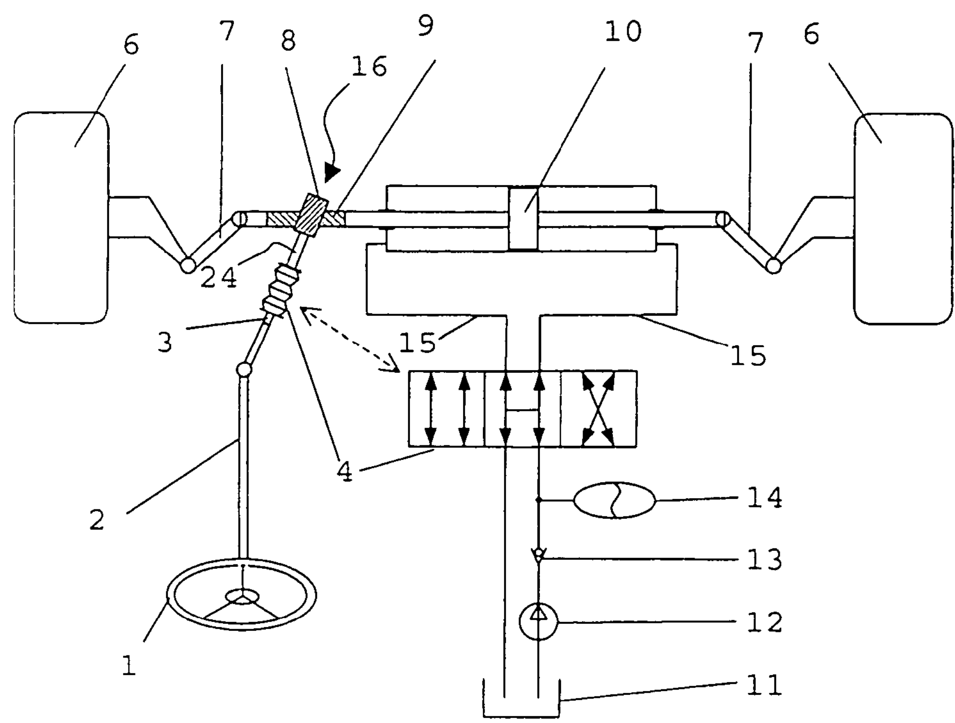
FIG. 1 shows schematically a vehicle steering system.

Identical components are designated in the various figures by the same reference numerals.

FIG. 1 shows a steering system according to the invention for a motor vehicle, which is not shown. A steering shaft 2 transmits the steering moment applied by a driver to the steering wheel 1 to an input shaft 3 of a steering gear 16.

The steering gear 16 comprises a housing in which a pinion 8 and a steering rack 9 are disposed. The pinion 8 is operatively connected to the input shaft 3 and engages the steering rack 9. This arrangement converts the rotational movement of the input shaft 3, or respectively, the pinion 8 into a linear movement of the steering rack 9. The steering rack 9 is connected to the front wheels 6 by way of left and right end connecting rods 7. Depending on the direction of movement of the rack 9, the front wheels 6 are steering the vehicle to the left or to the right. The steering gear 16 is further connected to a double-sided cylinder piston unit 10, which is coupled with the steering rack 9. A steering valve 4 controls the hydraulic oil supply to the cylinder piston unit 10 depending on the steering moment. Next to the schematic representation of the steering valve 4, FIG. 1 shows a symbolized block representation of the steering valve 4 using arrows for a better understanding of the operation.

A mechanically or electrically driven power steering pump 12 generates the oil pressure required for the power steering. The power steering pump 12 pumps oil from a tank 11 by way of a supply line with a check valve 13 to the steering control valve 4 and from there by way of pressure lines 15 to the cylinder piston unit 10 of the power steering unit 16. The oil is returned to the tank 11 via a return line. In a modified embodiment, the oil circuit includes a pressurized oil storage 14. If the power steering pump 12 fails, then there is some power steering still available for some time.

Figure 2:
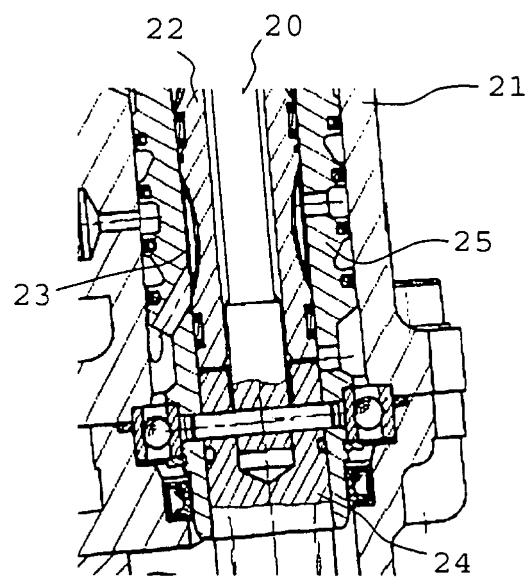
FIG. 2 is a longitudinal cross-sectional view of a steering valve unit.

FIG. 2 shows in a sectional view, the steering valve 4 in principle. A shaft 20 in the form of a torsion rod arranged in a steering valve housing 21 is connected at one end to the input shaft 3 shown in FIG. 1 and, at the other end, to the pinion shaft 24, or respectively, the pinion 8 of the steering gear unit 16. At the end of the input shaft 3, the torsion rod 20 is connected to a control spool 22, which includes control grooves 23. The pinion shaft 24 is connected to a control sleeve 25. In the assembled state of the steering valve 4, the control spool 22 the torsion rod 20 extends through the control spool 22 and the control spool 22 is surrounded by the control sleeve 25 which is arranged in the steering housing 21. The torsion rod is twisted under load and, because of this torsion twisting the control spool 22 rotates with respect to the control sleeve 25, which is connected to the pinion shaft 24. The control grooves 23 provided in the control spool 22 therefore are rotated with respect to the hydraulic oil admission openings, which are arranged in the control sleeve 25 but are not shown in the drawings. Depending on the angle of rotation, the oil flow cross-sections in the steering valve 4 are changed. In this way, a steering moment-dependent pressure control as required for the power steering is obtained.

FIGS. 3 and 3*a* are axial and transverse cross-sectional views of the torsion rod shaft 20. The torsion rod 20 is connected to the valve spool 22 and the pinion shaft 24 and is of a design as shown in FIGS. 3 and 3*a*. The torsion rod 20 comprises a first vibration damping element 27 such as an elastomer core and a second element 26 in the form of a slotted tube 26, which has low damping properties. The vibration damping element 27 is firmly connected to the inner surface of the slotted tube 26, for example, by vulcanization. FIG. 4 shows the characteristic performance lines 30, 29 for a solid metal torsion rod in comparison with a torsion rod 20 according to the invention. The slotted tube 26 is in accordance with the characteristic line 29 very elastic rotationally up to a twist angle $\phi$, where the slot 28 closes, that is, a small torsion moment Mt is sufficient to twist the tube 26 to the angle $\phi$, sec range 31. Starting at the twist angle $\phi$, the slot 28 is closed and the torsional rigidity of the tube 26 increases in the range 32 so that up to the maximum twist angle $\phi_{max}$, a torsion moment corresponding to the characteristic line 30 is followed that is like with the torsion rod of solid design.

A vibration caused by the wheels 6 as a result of uneven road surfaces is passed on via the rack 9, the pinion 8 and the torsion rod 20 to the steering wheel 1. The rotational vibration occuring at the steering wheel 1, called shimmy, can be reduced by the torsion rod according to the invention. The vibrations occurring as shimmy have generally a small amplitude. Under such a load, the torsion rod 20 behavior is defined by the area 31 of the characteristic line 29 of FIG. 4. As a result of the twisting of the vibration damping element 27, the vibration is attenuated and is not transmitted to the steering wheel 1. With small vibration amplitudes, the elastomer 27 arranged in parallel with the tube 26 is rotationally resilient because of the slot 28 so that the spring rigidity of the torsion rod 20 in this operational range is determined essentially by the vibration damping element 27. As a result, good vibration damping properties can be achieved by which rotational vibrations are rapidly attenuated. For the transmission of torsion moments, such as steering torques which result in a rotation of the torsion rod 20 in excess of the twist angle $\phi$, the rotational rigidity of the torsion rod 20 increases rapidly as shown in FIG. 4 for the range 32. The increased rotational rigidity provides for a reliable transmission of a steering movement from the steering wheel 1 to the steering gear 16.

In an embodiment as shown in FIGS. 5 and 5*a*, the torsion rod 20 comprises two parts, a first section 20' and a second section 20". Between the first and the second sections 20', 20", a vibration damping element 27 is arranged. The first torsion rod section 20' includes engagement members 34, which extends into openings 33 of the second torsion rod section 20".

If the torsion rod 20 is subjected to a torsion moment, the engagement members 34 are rotated with the torsion rod section 20' relative to the torsion rod section 20" within the rotational limit 35. As a result, up to a twist angle of ϕ, essentially only the vibration damping element 27 is twisted. Torsional vibrations which are caused by the road surface and have an amplitude below the twist angle ϕ, are therefore attenuated and uncoupled from the steering wheel 1, see the range 31 of the diagram of FIG. 3. With larger torsion moments such as steering wheel movements, for example, during parking maneuvers the rotational play range is exceeded so that the vibration damping element 27 cannot be further twisted as the engagement members 34 of the first section 20 of the torsion rod 20 directly engage the second section 20".

The rotational rigidity of the torsion rod 20 then increases as indicated for the range 32 of FIG. 3. In this range 32, the torsion rod 20 has the rotational rigidity as required for the transmission of the steering torque from the steering wheel 1 to the steering gear 16. The power assist for the power steering depending on the steering torque is adjustable or selectable by a selection of the reduction of the diameter of the second section 20" of the torsion rod.

What is claimed is:

1. A steering mechanism for a motor vehicle, comprising a steering wheel (1), a steering shaft (20) having opposite ends and being mounted with one end to the steering wheel (1), and a steering gear arrangement (16) mounted to the other end of the steering shaft (20), said steering shaft (20) comprising a first vibration damping element (27) and a second element (26) having lower damping characteristics than the first element (27), the second element (26) being a slotted tube so as to form an axial slot (28) which closes when the second element (26) is subjected to a predetermined torque whereby the spring rate of the second element is increased and the first element (27) is disposed within, and firmly connected to, the second element (26).

2. A steering mechanism according to claim 1, wherein the first element (27) is rotationally resilient so as to accommodate and attenuate vibrations with relatively small amplitudes as they are generated by uneven street surfaces.

3. A steering mechanism according to claim 1, wherein the first element (27) consists of an elastomer material.

4. A steering mechanism according to claim 1, wherein the second element (26) has only a small spring rate for accommodating impulses of amplitudes below a predetermined level.

5. A steering mechanism according to claim 4, wherein the slot (28) closed during steering movements With amplitudes exceeding the predetermined level as they are present for the transmission of the steering movements, the second element (26) has an increased spring rate.

6. A steering mechanism according to claim 1, wherein up to a predetermined angle the first element (27) is twistable relative to the second element (26) but with rotations exceeding the predetermined angle the second element (26) is rotated.

7. A steering mechanism according to claim 1, wherein the steering shaft (20) is a torsion rod and the steering gear arrangement (16) is a power steering which provides steering power assistance depending on the twist angle of the torsion rod (20).

* * * * *